United States Patent [19]

Stepp et al.

[11] Patent Number: 4,712,619

[45] Date of Patent: Dec. 15, 1987

[54] POPPET VALVE

[75] Inventors: Lee W. Stepp, Comanche; Richard L. Giroux, Duncan, both of Okla.

[73] Assignee: Halliburton Company, Duncan, Okla.

[21] Appl. No.: 892,004

[22] Filed: Jul. 30, 1986

[51] Int. Cl.[4] .................... F21B 34/08; F16K 15/00
[52] U.S. Cl. .................... 166/327; 137/515; 137/515.3
[58] Field of Search .......... 166/325, 326, 327, 285, 166/242; 137/515, 859, 515.5, 515–517

[56] References Cited

U.S. PATENT DOCUMENTS

| | | |
|---|---|---|
| 1,615,811 | 1/1927 | Pearce . |
| 1,659,478 | 2/1928 | Black . |
| 1,776,613 | 9/1930 | Baker . |
| 2,058,688 | 10/1936 | Halliburton . |
| 2,063,821 | 12/1936 | McKenzie ............... 137/515 |
| 2,075,293 | 3/1937 | Larkin . |
| 2,182,278 | 12/1939 | Brauer . |
| 2,223,509 | 12/1940 | Brauer . |
| 2,771,091 | 11/1956 | Baker et al. . |
| 2,802,482 | 8/1957 | Arnhold . |
| 2,858,838 | 11/1958 | Scaramucci ............ 137/515 X |
| 3,385,370 | 5/1968 | Knox et al. . |
| 3,419,040 | 12/1968 | Thibodeaux ............ 137/515.7 |
| 3,776,250 | 12/1973 | Knox . |
| 3,957,114 | 5/1976 | Streich . |
| 4,067,358 | 1/1978 | Streich . |
| 4,338,999 | 7/1982 | Carter, Jr. . |
| 4,624,316 | 11/1986 | Baldridge et al. ......... 137/515 X |

Primary Examiner—Stephen J. Novosad
Assistant Examiner—David J. Bagnell
Attorney, Agent, or Firm—James R. Duzan

[57] ABSTRACT

The improved poppet valve of the present invention comprises a simpler and shorter valve which meets or exceeds prior art performance characteristics while being easier and cheaper to make and to fabricate into a float collar or float shoe. The improved poppet valve of the present invention comprises a tubular one-piece body having flange means on the exterior thereof, and a downward-facing valve seat at the bottom interior thereof, with a valve guide spider thereabove. A dome-shaped poppet valve seats on the aforesaid valve seat, and has coaxially secured thereto a upwardly extending stem bolt which protrudes through and above the valve body guide spider. A spring disposed about the stem bolt biases it upwardly, acting on the top surface of the spider and on a lower surface of a spring retention cap secured to the top of the stem bolt. In such a manner, the poppet valve is biased into engagement with the valve body seat at the lower end of the valve assembly. The poppet valve of the present invention may be employed in a section of casing or in a guide shoe to form a float collar or float shoe, respectively, wherein the valve assembly is secured in place by a cement sheath.

3 Claims, 2 Drawing Figures

POPPET VALVE

BACKGROUND OF THE INVENTION

This invention relates generally to improvements in check valves, and more particularly, but not by way of limitation, to fluid flow-actuated check valves suitable for use in float collars, float shoes or other casing equipment in well cementing operations.

When casing is inserted into a well bore, it is subsequently fixed and supported therein by an operation known as primary cementing. Cement is forced down the bore of the casing, through an aperture in the guide shoe at the bottom of the casing, and up the annulus surrounding the casing and between the casing and the well bore to the desired level. One or more valves, commonly termed float valves, are installed in the casing to prevent back flow of the cement into the casing from the annulus if pressure in the casing is reduced. Such a float valve may be in the form of a collar or an integral part of the guide shoe. The closed float valve or valves also seal the bottom of the casing and prevent fluids in the well bore from filling it when the casing is lowered into the well bore, thus providing buoyancy in the casing and reducing total weight supported by the rig derrick. Illustrative of this type of float valve are the Halliburton float collar with Super Seal valve and the Super Seal valve float shoe, depicted on pages 2433 and 2434, respectively, of Halliburton Services Sales and Service Catalog No. 43. After the casing is in place in the well bore, a bottom cement plug may be pumped before the cement, in order to displace any fluid in the casing, down through the casing to seat above the uppermost float valve, at which point pressure is increased in the casing, a diaphragm in the bottom plug is ruptured, and cement flows through the bottom plug, opening the float valve or valves by overcoming its biasing mechanism. The cement then travels to the well bore annulus, as previously described. A top plug follows the cement, and is pumped down the casing bore to seat on the bottom plug, at which point the back pressure from the cement in the casing below the float valve and in the well bore annulus is supposed to close the valve.

While many types of float valves other than the Halliburton poppet-type Super Seal valve are currently known in the art (for example, flapper type or ball type valves), it is believed that a poppet-type valve provides exceptionally reliable operation. A problem with prior art poppet-type valves of the Super Seal type, however, is that they are more expensive to manufacture than other type float valves, both due to the number of parts required for the valve assembly as well as the overall length of the valve assembly alone and as it is normally employed in a section of casing equipment, maintained therein by a cement sheath extending between the outside of the valve assembly and the inside of the casing equipment section. This cement is used not only to seal between the valve assembly and the casing equipment section, but also to support the valve assembly against pressure exerted by cement or other fluid below the valve assembly as a result of hydrostatic pressure in the casing/well bore wall annulus.

SUMMARY OF THE INVENTION

In contrast to prior art poppet valves, the improved poppet valve of the present invention comprises a simpler and shorter valve which meets or exceeds prior art performance characteristics while being easier and cheaper to make and to fabricate into a float collar or float shoe.

The improved poppet valve of the present invention comprises a tubular one-piece body having flange means on the exterior thereof, and a downward-facing valve seat at the bottom interior thereof, with a valve guide spider thereabove. A dome-shaped poppet valve seats on the aforesaid valve seat, and has coaxially secured thereto an upwardly extending stem bolt which protrudes through and above the valve body guide spider. A spring disposed about the stem bolt biases it upwardly, acting on the top surface of the spider and on a lower surface of a spring retention cap secured to the top of the stem bolt. In such a manner, the poppet valve is biased into engagement with the valve body seat at the lower end of the valve assembly.

The poppet valve of the present invention may be employed in a section of casing or in a guide shoe to form a float collar or float shoe, respectively, wherein the valve assembly is secured in place by a cement sheath.

BRIEF DESCRIPTION OF THE DRAWINGS

The present invention will be better understood from a review of the following detailed description of the preferred embodiment taken in conjunction with the accompanying drawings wherein.

DETAILED DESCRIPTION AND OPERATION OF THE PREFERRED EMBODIMENT

Figure 1:
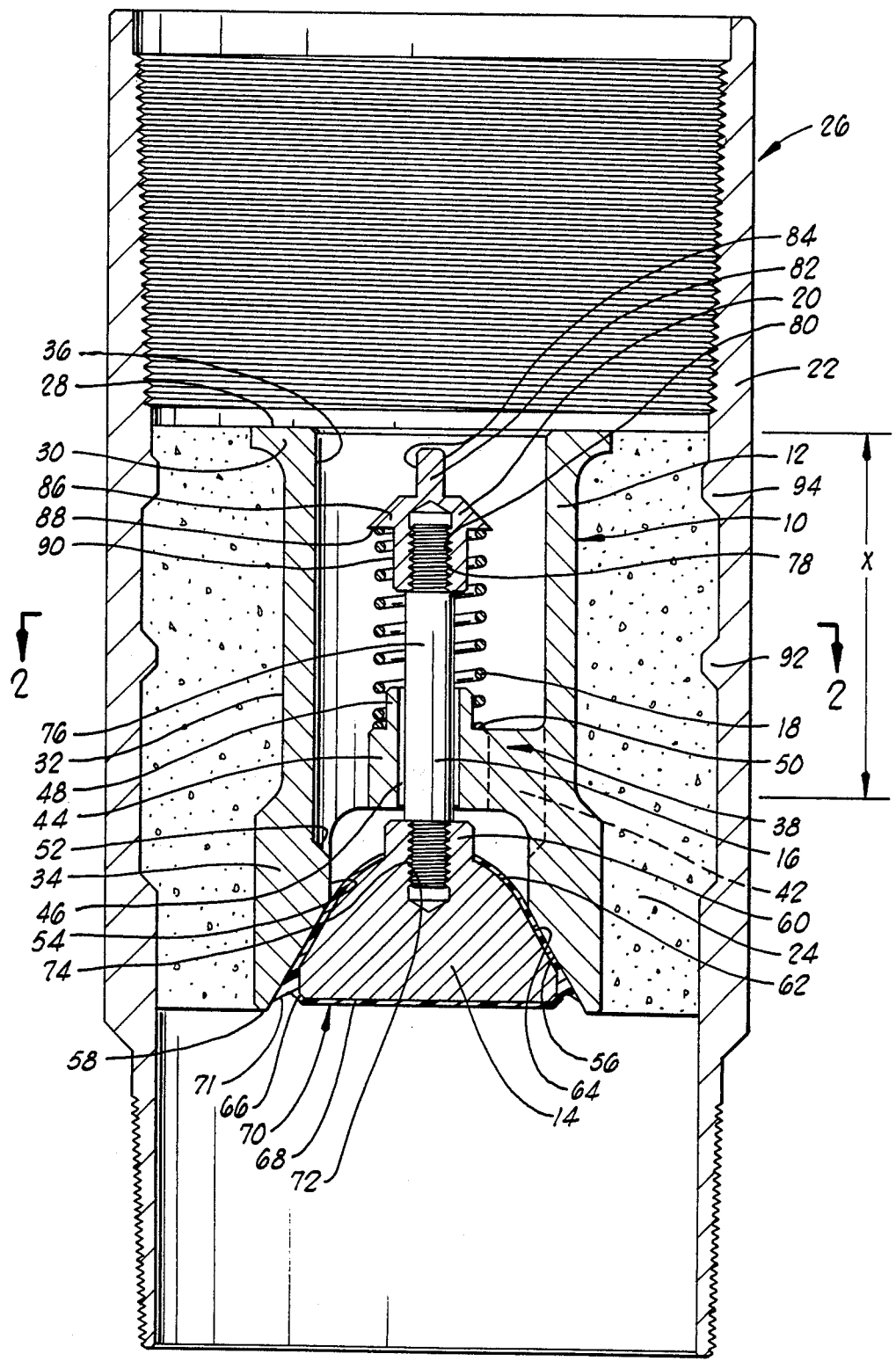
FIG. 1 is a vertical cross-sectional elevation of a length of casing having the poppet valve assembly of the present invention disposed therein and maintained therein by a cement sheath.
Figure 2:
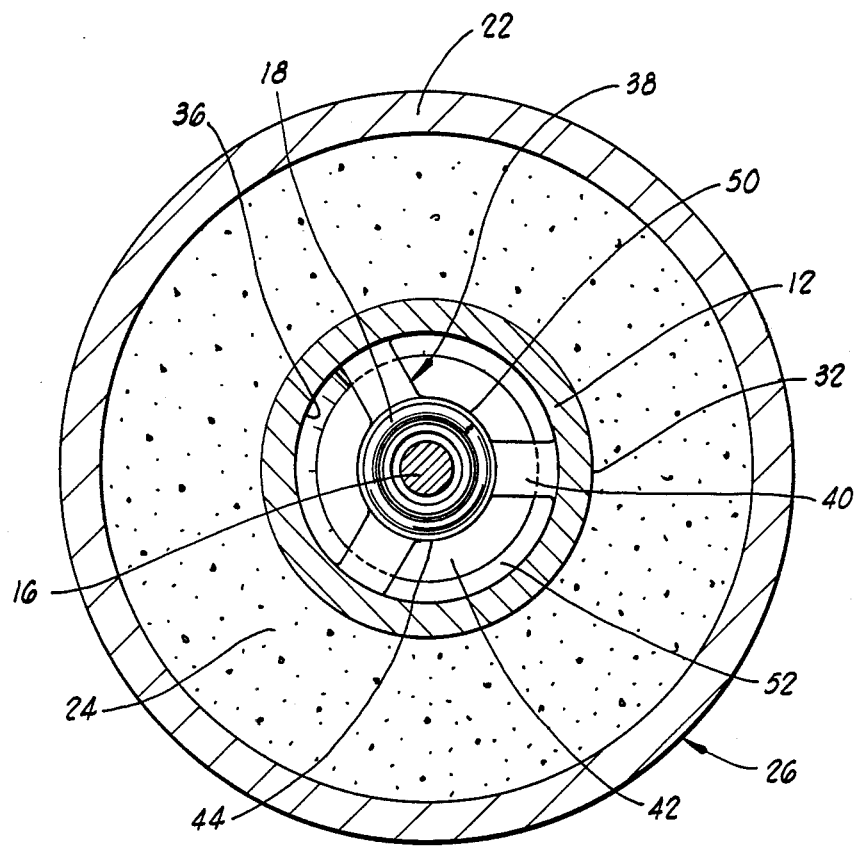
FIG. 2 is a section taken across lines 2—2 of FIG. 1.

Referring to FIGS. 1 and 2 of the drawings, the improved poppet valve assembly 10 of the present invention comprises a one-piece tubular valve body 12, a valve poppet 14, a stem bolt 16, a valve spring 18, and a spring retention cap 20. Valve assembly 10 is maintained in short casing section or collar 22 by cement sheath 24 to form a float collar assembly 26 in the illustrated embodiment, although valve assembly 10 may be incorporated in a guide shoe or other casing equipment item.

Valve body 12, which can be made of aluminum, molded plastic, or any other suitable material, includes a radially extending flat plug seat 28 at the top thereof substantially flush with the top of cement sheath 24, plug seat 28 comprising the top of an annularly extending flange 30 above a downwardly extending cylindrical surface 32 of lesser diameter which leads to valve seat base 34 at the bottom of valve body 12, valve seat base 34 being of greater diameter than surface 32 and of like diameter to flange 30. The upper interior of valve body 12 is defined by cylindrical bore 36, which extends downwardly to valve guide spider 38 comprising a plurality of legs 40 extending radially inwardly from bore wall 36 to a central valve guide collar 44, legs 40 and collar 44 defining apertures 42 therebetween. Axial bore 46 extends through collar 44 from the top to the bottom thereof. At the top of collar 44, annular upset 48 extends upwardly from annular spring shoulder 50.

Below spider 38, bore wall 36 terminates at inwardly tapered obliquely oriented ledge 52, extending inwardly to lower bore wall 54 of lesser diameter, below which downwardly facing frustoconical valve seat 56 extends to the bottom edge 58 of valve body 12.

Dome-shaped valve poppet 14, which may be formed of any drillable material but which is preferably formed of phenolic plastic or a drillable metal, includes short cylindrical stem bolt sleeve 60 at the top thereof, below which a downwardly extending arcuate annular surface 62 leads to major valve surface 64, of frustoconical configuration. Longitudinally oriented annular trailing edge 66 extends to the flat bottom 68 of valve poppet 14. In order to facilitate the sealing of major valve surface 64 against valve seat 56, an elastomeric poppet sheath 70 is bonded to and around valve poppet 14 below sleeve 60, a circumferential sealing lip 71 at the lower periphery of sheath 70 providing an additional flapper-type seal against major valve surface 64 in response to pressure from below assembly 10. Threaded axial bore 72 extends from the interior of valve poppet 14 to the top of sleeve 60, and receives threaded lower end 74 of stem bolt 16, preferably of aluminum. As as alternative to a threaded connection, poppet 14 may be molded about the lower end of stem bolt 16, which in that instance would have a lateral protrusion thereon to engage the molded plastic. Above threaded lower end 74, cylindrical mid-section 76 of greater exterior diameter extends upwardly into and through axial bore 46 of collar 44 of spider 38. At the top of stem bolt 16 lies threaded top end 78 of lesser diameter than mid-section 76, and of like diameter to lower end 74.

Metal coil valve spring 18, preferably of aluminum, is disposed about upstanding mid-section 76 of stem bolt 16, the lower end of spring 18 resting on spring shoulder 50 of collar 44. Spring 18 is maintained on and about stem bolt 16 by aluminum or plastic spring retention cap 20 having a downwardly extending axial bore 80 which is threaded to top end 78 of stem bolt 16. Head 82 extends upwardly from the top of cap 20, and provides flat gripping surfaces 84 by which cap 20 may be tightened onto the threaded top end 78 of stem bolt 16. Annular flange 86 having flat lower surface 88 extends outwardly beyond the exterior diameter of spring 18 and cylindrical lower section 90 of lesser diameter than flange 86 extends downwardly about the top end 78 of stem bolt 16 inside of spring 18. When valve assembly 10 is in the closed position, as shown in FIG. 1, cap 20 lies just below plug seat 28 at the top of valve body 12, so as not to contact any bottom plug received on seat 28.

As previously indicated, annular cement sheath 24 extends between the exterior of valve body 12 and the interior of collar 22, which is commonly termed a float collar. It should be noted that any upward force exerted on valve assembly 10 by fluids therebelow in the casing is borne by cement sheath 24 through an area defined by the diametrical difference between valve seat base 34 and cylindrical surface 32 of valve body 12, acting on the cement thereabove in the vicinity of cylindrical surface 32 on valve body 12.

This same upward force on cement sheath 24 acts on casing section or collar 22 at inwardly extending annular protrusions 92 and 94 on the interior thereof. It will readily be noted by the skilled artisan that the portion of cement sheath 24 which lies below the top of valve seat base 34 of valve body 12, while providing a filler between valve assembly 10 and collar 22, lends no support to valve assembly 10 against upward force. Thus, the bearing height of cement sheath 24 is effectively the distance "X" as shown on the righthand side of FIG. 1 of the drawings. An understanding of this bearing height must be obtained to fully appreciate the advantages of the poppet valve of the present invention in comparison to prior art poppet valves. For example, in the prior art Halliburton Services Super Seal poppet valves, the valve poppet lies at the top of a stem bolt, this assembly extending upwardly a substantial distance from a supporting spider. The Super Seal poppet seats on a valve seat thereabove, and the force of fluid in the casing below the Super Seal valve assembly incorporated in a float collar or shoe is therefore applied at the top of the Super Seal valve assembly. This arrangement then requires an additional length of cement sheath above the valve assembly in order to prevent it from being blown out of the casing collar or shoe by the pressure exerted therebelow. This additional length of cement above the valve assembly also necessitates the use of a separate plug seat at the top of the sheath, or a greatly elongated valve body with seat at the top thereof, to receive the aforementioned bottom cementing plug. It is also apparent that the prior art poppet design with the valve poppet at the top of the assembly necessitates a multi-piece design for the valve body in order to be able to place the poppet above the spider and below the valve seat in the interior of the valve body. A further disadvantage of the prior art design is the necessarily large diameter of the valve body, in order to accommodate the valve poppet in the interior of the assembly. In contrast, it can readily be seen in FIG. 1 of the drawings that the poppet valve of the present invention, with the valve poppet 14 at the lower end thereof, permits an axial bore 36 of lesser diameter than valve poppet 14, but which provides a flow area equal to a similar, but larger, Super Seal valve assembly. Further, when a poppet valve of the present invention is incorporated in a float collar or float shoe assembly, the required collar or shoe length and the volume of cement required to hold the valve assembly therein is greatly reduced.

When the improved poppet valve of the present invention, incorporated in a float shoe or float collar, is employed in a primary cementing operation, cement is pumped downwardly therethrough, downwardly biasing valve poppet 14 against spring 18, and permitting flow between the disengaged valve poppet 14 and valve seat 56. Prior to the commencement of cementing flow, the engagement of major valve surface 64 with frustoconical valve seat 56 provides a tight seal via elastomeric sheath 70, which prevents the entry of well bore fluids into the casing above float collar 26 from below, thus providing an empty and therefore buoyant casing which may literally be "floated" down into the well bore, relieving strain on the derrick of the drilling rig. During the primary cementing operation, whenever cement flow is stopped for any reason, the force of the hydrostatic pressure of well bore fluids and cement below float collar assembly 26 pushes valve poppet 14 upwardly into contact with valve body 12, thus reestablishing the seal between major valve surface 64 and valve seat 56. Valve poppet 14 is prevented from cocking in valve body 12 by stem bolt 16 riding in collar 44.

It is thus apparent that a novel and unobvious improved poppet valve assembly has been invented. While the invention has been disclosed in terms of a preferred embodiment, it will be appreciated by one of ordinary skill in the art that many additions, modifications and deletions to the preferred embodiment may be made without departing from the spirit and scope of the invention as claimed.

We claim:

1. A float device for use in a well bore cementing operation, said float device comprising:
 a casing equipment housing including a tubular section having an axial bore therethrough;
 a valve assembly axially disposed in said tubular section axial bore of said casing equipment housing, said valve assembly including:
  a unitary tubular valve body having a radially extending flange at the top exterior thereof defining a plug seat, a valve seat base therebelow and a cylindrical surface of lesser diameter than said flange and said valve seat base and extending therebetween and an axial bore extending therethrough with a downwardly-facing valve seat therein adjacent said valve seat base, said valve seat having a generally frustoconical configuration;
  a guide spider above said valve seat comprising a plurality of radially oriented legs extending inwardly from the wall of said axial bore of said unitary tubular valve body to a central cylindrical collar having an axial stem bolt bore therethrough and a shoulder having, in turn, an upset extending upwardly therefrom;
  a valve poppet having an upwardly-facing valve surface of frustoconical configuration thereon disposed adjacent said valve seat sealingly engaging the generally frustoconical configuration thereof and having an elastomeric sheath over the frustoconical configuration of said upwardly-facing valve surface, said elastomeric sheath including a circumferentially-extending lip at the lower periphery thereof;
  a stem bolt secured to said valve poppet and extending upwardly through said stem bolt bore in said collar;
  a spring retention cap at the top of said stem bolt, said spring retention cap including an outwardly extending flange thereon and a lower cylindrical section of lesser diameter than said flange; and
  a coil spring disposed about said stem bolt above said collar, said coil spring being supported on said annular spring shoulder on said guide spider being centered thereon by said upset extending upwardly from said shoulder into said spring and extending over said cylindrical section on said spring retention cap abutting the outwardly extending flange thereon; and
 a cement sheath surrounding said valve assembly and substantially filling the annular void between said valve assembly and the wall of said tubular section bore of said casing equipment housing, said cement sheath having a top surface substantially flush with said plug seat on said valve body.

2. The apparatus of claim 1, wherein the bottom surface of said cement sheath is located at least adjacent to the upper extent of said valve seat base.

3. The valve assembly of claim 1, wherein said axial bore extends downwardly past said spider at a constant diameter, necking inwardly therebelow above said valve seat.

* * * * *